Patented Apr. 18, 1933

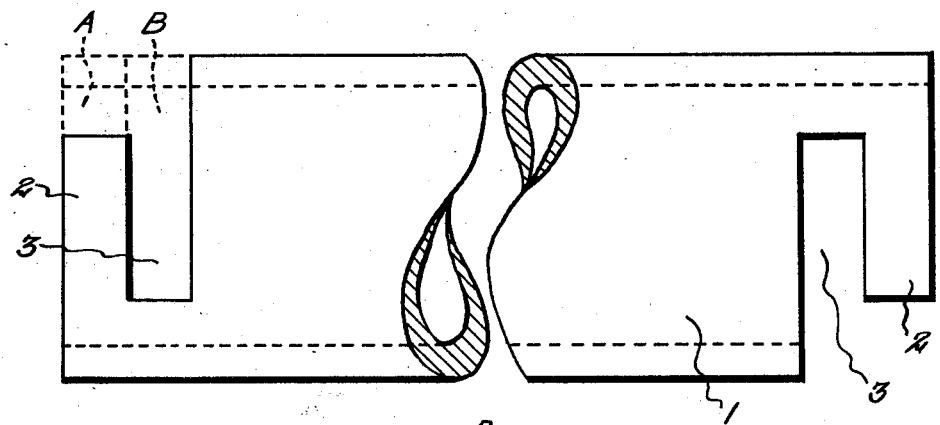
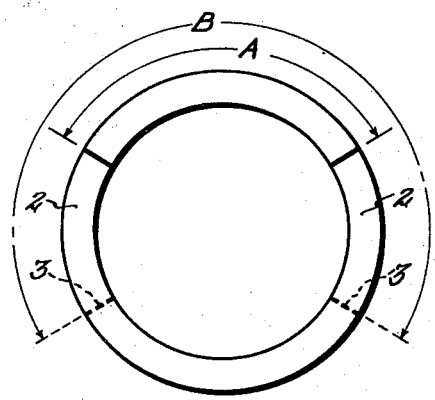
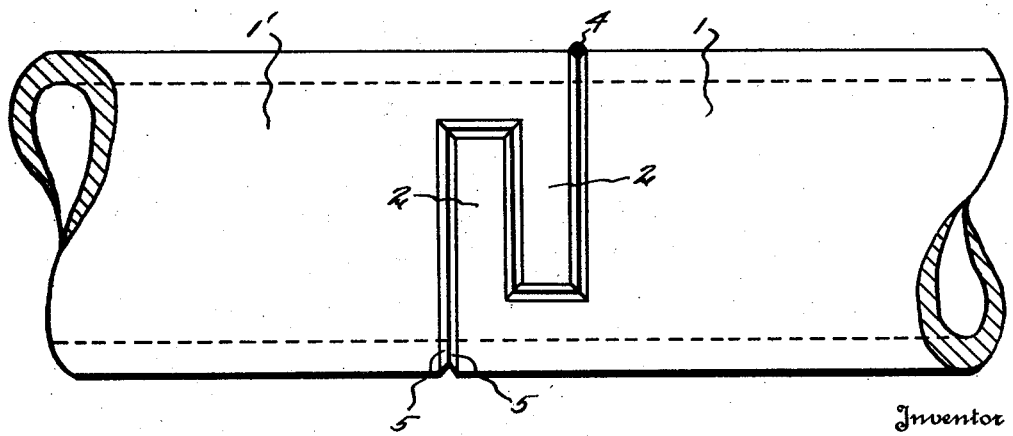

1,903,852

UNITED STATES PATENT OFFICE

LEVY J. ROLLINS, OF BEAUMONT, TEXAS, ASSIGNOR OF ONE-HALF TO PETE D. RENFRO, OF BEAUMONT, TEXAS

PIPE JOINT

Application filed October 5, 1929. Serial No. 397,659.

This invention relates to a means for welding individual pipe sections together, and has for an object the provision of a tongue and groove arrangement at each end of a pipe section, whereby the same may be interlocked with a similar tongue and groove arrangement on another pipe section prior to welding said sections together, to afford a joint of maximum strength and efficiency.

Other objects of this invention will become apparent as the description thereof proceeds reference being had to the accompanying drawing wherein:—

Figure 1 is an elevational view of one end of the pipe section,

Figure 2 is an end view of the same, and

Figure 3 is an elevational view of the interlocked ends of two pipe sections prior to welding.

On each end of a metallic pipe section 1, that is capable of being welded as by electric or acetylene welding, are formed tongues 2 and grooves 3, the tongue and groove at one end being oppositely disposed from the tongue and groove on the other end, as clearly shown in Figure 1. To form the tongue 2 and groove 3, two juxtaposed circumferential segmental portions of equal width at each end of the pipe are cut away, said segmental portions being designated by the letters A and B in Figures 1 and 2. As will be noted, the segment B is of much greater circumferential length than the segment A thereby forming two substantially diametrically opposed tongues 2 and grooves 3 on the ends of the pipe 1 when the segment A and said segment B are removed.

To join two pipe sections 1 and 1' together the tongues 2 of one pipe section are inserted in the grooves 3 of the other pipe section in the manner shown in Figure 3. The abutting edges are then welded together as at 4 in the manner well known in the art.

If desired the edges of the tongues and grooves may be beveled as at 5, see Figure 3, to facilitate ease in welding the abutting edges together and to increase the efficiency of the joint.

Pipe sections joined and welded together in the manner described above are practically indestructible at the joints, due to the interlocking of the ends, and while a preferred embodiment thereof has been shown the same is susceptible of various changes within the scope of the appended claim.

Having thus described my invention, what I claim as new and desire to secure by Letters Patent is:

A welded pipe joint comprising two metal pipe sections having similar but oppositely disposed interlocking means on the end portions thereof and constituting an integral part of the pipe proper, said interlocking means comprising a pair of tongues and grooves cut from the end portions of the pipe proper, the tongues and grooves on one end of the pipe extending in an opposite direction from the tongues and grooves on the other end thereof, the tongues and grooves being of equal size in all dimensions, the tongues extending radially a substantial distance greater than the width of the grooves and lying in a cylindrical plane having the same radius as that of the pipe section, whereby the tongues on one pipe section will fit snugly in the grooves on the other pipe section of the same size in interlocking engagement, the abutting edges of said tongues and grooves in interlocking engagement and of said pipe section being beveled and a filling of weld metal in the bevel to form a rigid joint between the abutting edges of the pipe section and of the tongues and grooves of the two adjacent pipe sections.

In testimony whereof I affix my signature.

LEVY J. ROLLINS.